(12) United States Patent
Durand et al.

(10) Patent No.: US 7,233,926 B2
(45) Date of Patent: *Jun. 19, 2007

(54) ELECTRONIC WALLET SYSTEM WITH SECURE INTER-PURSES OPERATIONS

(75) Inventors: Alain Durand, Rennes (FR); Sylvain Lelièvre, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 579 days.

This patent is subject to a terminal disclaimer.

(21) Appl. No.: 09/797,070

(22) Filed: Mar. 1, 2001

(65) Prior Publication Data

US 2001/0034719 A1 Oct. 25, 2001

(30) Foreign Application Priority Data

Mar. 7, 2000 (EP) .................. 00400605

(51) Int. Cl.
*G06F 17/00* (2006.01)

(52) U.S. Cl. .............. 705/65; 235/375; 902/1

(58) Field of Classification Search ........... 705/64–68, 705/71–79; 235/375–380; 709/200–203; 902/1–21, 24–31
See application file for complete search history.

(56) References Cited

U.S. PATENT DOCUMENTS

| | | | |
|---|---|---|---|
| 5,247,578 A | 9/1993 | Pailles et al. | 380/24 |
| 5,623,547 A | 4/1997 | Jones et al. | 380/24 |
| 5,917,168 A * | 6/1999 | Nakamura et al. | 235/379 |
| 6,032,135 A | 2/2000 | Molano et al. | 705/41 |
| RE36,788 E * | 7/2000 | Mansvelt et al. | 235/379 |
| 6,250,557 B1 * | 6/2001 | Forslund et al. | 235/492 |
| 6,282,522 B1 * | 8/2001 | Davis et al. | 705/41 |
| 6,753,830 B2 | 6/2004 | Gelbman | |

FOREIGN PATENT DOCUMENTS

| | | |
|---|---|---|
| EP | 0546584 | 6/1993 |
| EP | 793 186 A2 | 3/1997 |
| EP | 0793186 | 9/1997 |

(Continued)

OTHER PUBLICATIONS

"Europe, Chip Card Leader, Still Seeks Maturity", American Banker, p. 14, Dec. 1, 1999.*

(Continued)

*Primary Examiner*—Mary D. Cheung
(74) *Attorney, Agent, or Firm*—Joseph J. Laks; Robert D. Shedd; Paul P. Kiel (57) ABSTRACT

The electronic wallet system comprises a plurality of devices interconnected through a local network and capable of conducting electronic business transactions on an open network. Each device contains a smart card reader. A plurality of smart cards represent electronic purses able to contain electronic money. One of the devices contains an entity, the server, which contains a list of data entries, each entry corresponding to a purse liable to receive electronic money, contained in tokens, from other purses of the system. The tokens transferred between purses are stored temporally by the server. In order to improve the security of the transactions, the messages which are exchanged between the devices and/or the smart cards during token transfer operations are protected by secret keys which are only stored in the smart cards of the system.

24 Claims, 8 Drawing Sheets

FOREIGN PATENT DOCUMENTS

| | | |
|---|---|---|
| EP | 793 186 A3 | 12/1997 |
| EP | 924 667 A2 | 6/1999 |
| EP | 0924667 | 6/1999 |
| WO | 97/046609 | 2/1997 |
| WO | WO97/04609 | 2/1997 |
| WO | WO 9840852 A1 * | 9/1998 |
| WO | 00/11624 | 3/2000 |
| WO | WO00/11624 | 3/2000 |

OTHER PUBLICATIONS

Search Report for EP Appln 00400606 Attached.
Search Report for EP Appln 01400506 Attached.
Aug. 2000, European Search Report.

* cited by examiner

ELECTRONIC WALLET SYSTEM WITH SECURE INTER-PURSES OPERATIONS

BACKGROUND OF THE INVENTION

1. Field of the invention

The present invention relates generally to electronic wallets for performing electronic commercial transactions on open networks such as internet, and more particularly to a new electronic wallet architecture and to methods for transferring tokens (or electronic money units) between electronic wallets.

2. Description of the Related Art

Another European patent application No. 00400606.0 filed the same day as the present application (Mar. 7, 2000), in the name of the same applicant and having the following title: "electronic wallet system", describes an electronic wallet system having a client/server architecture and comprising a plurality of purses. The client and server applications are executed in devices, such as set-top boxes (STB) and the system allows secure inter-purses operations.

The present application proposes an alternative solution to secure inter-purses operations in the electronic wallet system.

SUMMARY OF THE INVENTION

The invention relates to an electronic wallet system comprising n devices capable of conducting electronic business transactions on an open network and containing a smart card reader, wherein n is superior or equal to 1, and a plurality of smart cards representing electronic purses able to contain electronic money. The devices are interconnected through a local network and one of the devices comprises an entity, called the server, which contains a list of data entries, each entry corresponding to a purse liable to receive electronic money contained in tokens from others purses of the system. The server stores temporally the tokens when they are transferred between purses. According to the invention the messages which are exchanged between the devices and/or the smart cards during token transfer operations are protected by secret keys which are only stored in the smart cards.

The invention further relates to a process for registering a purse in such an electronic wallet system as described in section A-2. of the description.

The invention also relates to a process for depositing a token from a first purse for a second purse in such an electronic wallet system as described in section A-3. of the description and to a process for receiving a token in a purse as described in section A-4. of the description.

In addition, the invention concerns a process for recovering tokens which have been deposited for one purse using the token depositing process as described in section A-3. below but which have not been received by said purse when using the token receiving process described in section A-4. below. This lost token recovery process is described in section B of the description.

Moreover, the invention relates to an electronic wallet system in which each smart card of the system further contains an address of the server on the open network and in which each device is capable of conducting remote token depositing process, as described in section C-1. of the description, and/or remote token receiving process, as described in section C-2. of the description, with a remote electronic wallet system connected to the open network.

BRIEF DESCRIPTION OF THE DRAWINGS

The various features and advantages of the present invention and its preferred embodiments will now be described with reference to the accompanying drawings which are intended to illustrate and not to limit the scope of the present invention and in which.

DESCRIPTION OF THE PREFERRED EMBODIMENTS

Figure 1:
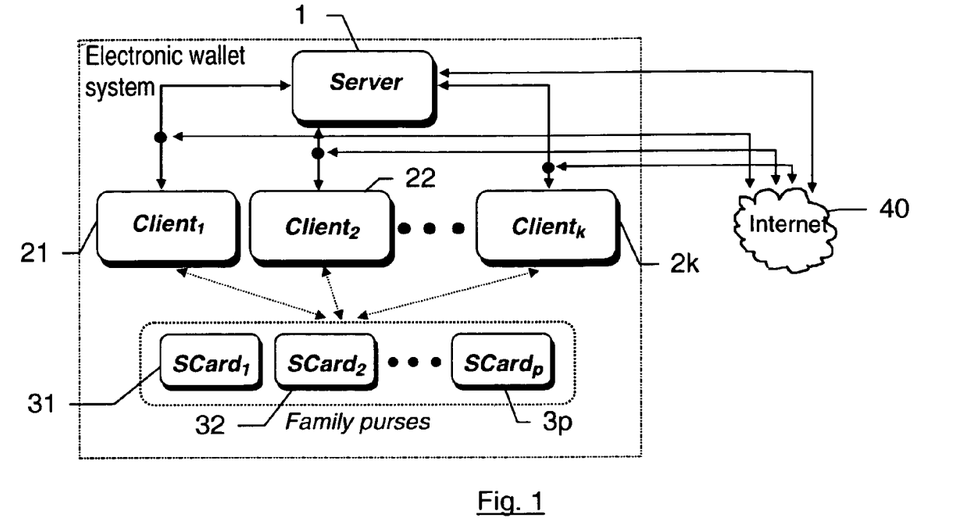
FIG. 1 illustrates the general architecture of an electronic wallet system according to the invention.

FIG. 1 illustrates the general architecture of a local electronic wallet system according to the invention which corresponds to the configuration of the system in a family.

As it can be seen on this FIG. 1, an electronic wallet system contains three entities:

a first entity 1 called the Server which is connected to an open network 40 (for example internet). This entity is responsible for the inter-purses operations, as will be explained in more details below;

a set of k second entities 21 to 2k called clients which are also connected to an open network 40 (e.g. Internet). Moreover, each of these clients is also connected to the server via a local home network;

a set of p smart cards 31 to 3p, the third entities (where p is the number of persons in the family) which implement the purses. Thus, each member of the family possesses his own purse represented by a smart card.

From these different entities, each member of the family should be able to participate to secured e-commerce activities. In fact, a smart card provides to the user an efficient and secure way to store all personal and sensitive data such as private keys, digital tokens, authentication data, etc.

Figure 2:
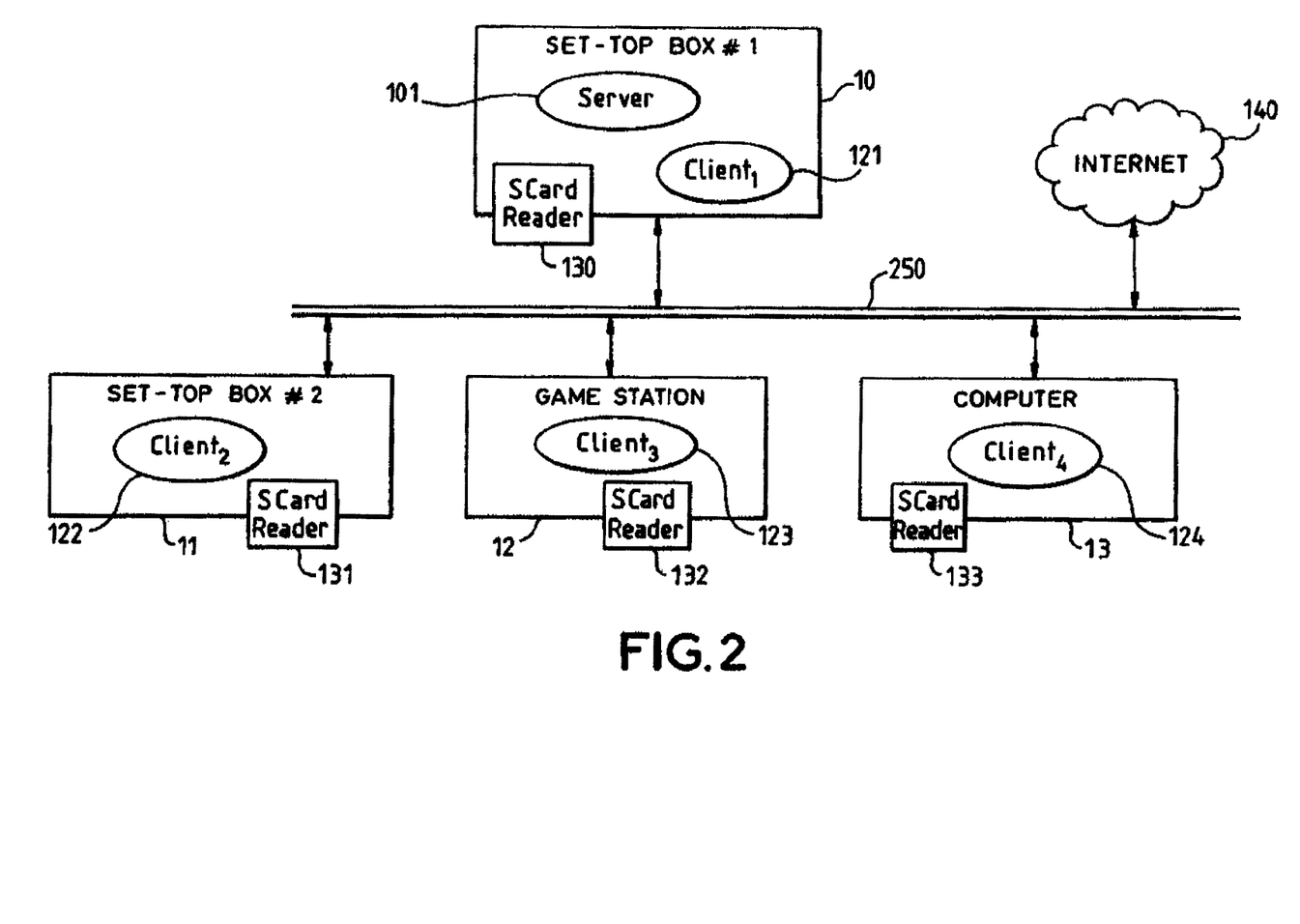
FIG. 2 illustrates an example of hardware architecture of an electronic wallet system according to the invention.

An example of hardware implementation of this architecture is illustrated in FIG. 2. The entities "Server" and "Clients" are implemented, in a preferred embodiment, by software applications running in devices such as set-top boxes, computers, game stations, portable phones or any other home equipment.

In the example of FIG. 2, a first set-top box 10 contains the server application 101 and one Client$_1$ application 121. This first set-top box is for example located in the living-room of the family house. A second set-top box 11, located in another room of the house, contains another Client$_2$ application 122, while two other devices, a game station 12 and a computer 13, located in children bedrooms for example, contain respectively Client$_3$ application 123 and Client$_4$ application 124. The devices are equipped with smart card readers 130-133 and are all connected to a home network 250, which may be an IEEE 1394 wire or wireless network. This home network 250 provides a connection to an open network 140 for all the devices 10-13.

All the applications 101, 121-124 use some resources of the devices to access to the smart card readers 130-133 and to the local and/or open network.

In order to simplify the further discussion, the terms "server" and "client" will be used hereafter to refer either to the application itself or to the device containing the application, with the exception that the device referred to as "server" also contains a client application.

Thus, when the user wants to perform electronic financial operations (electronic commerce, token purchase, purse-to-purse token transfer . . . ), he has to insert his smart card in the smart card reader of a client (here, the device) that contains all needed software in order to perform all of these activities (macropayment protocols, micropayment protocols, etc.).

It should be noted that the server is also capable of performing electronic financial and business operations because it also contains a client and that, in an extreme solution, the electronic wallet system contains only one device containing the server application and one client application.

We will now describe the inter-purses operations.

Contrary to classical financial operations (e-commerce, token purchase, etc.), the inter-purses operations need the participation of the server. All needed information used to make these inter-purses operations are centralized in the server which is connected to all clients via a local home network (250 in FIG. 2).

The inter-purses transfer of tokens is implemented by two operations: token depositing and token receiving. During the token depositing operation, a user A deposits x tokens intended for another family member B from any client. The x tokens are debited from the purse of the user A and stored temporally in the server. Next time, when the user B inserts his purse at any client, the token receiving operation is called to download the x tokens from the server. In this way, tokens are transferred from the purse of the user A to the purse of the user B thanks to the server.

To this end, the server contains a list of all registered purses representing the purses which can receive tokens from other purses. The registered purses are used to temporally store the list of tokens intended for the owner of the purses.

Figure 3:
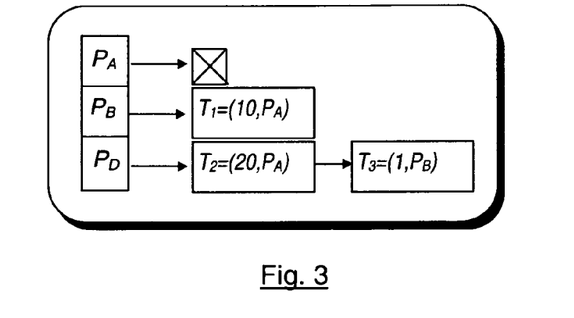
FIG. 3 illustrates some data contained in one entity called the server of the electronic wallet system.

FIG. 3 shows an example of these internal data located on the server. On this figure, three purses denoted by P$_A$, P$_B$ and P$_D$ are registered in the server. As for purse P$_A$, no tokens have been stored meaning that the purse P$_A$ has not received any token from another purse. As for purse P$_B$, the token T$_1$ denoted by (10,P$_A$) indicates that the purse P$_B$ has received 10$ (or 10 Euro, or 10 units of any money used in the electronic wallet system) from the purse P$_A$. This token will be transferred to the purse P$_B$ at the next use of P$_B$. As for purse P$_D$, the tokens T$_2$ (20 units of money received from purse P$_A$) and T$_3$ (1 unit of money received from purse P$_B$) will be transferred to P$_D$ at the next use of P$_D$.

It is therefore necessary to consider, in addition to the operations of token depositing and token receiving, a third one, called purse registering. This operation consists in the registration of the purses in the server. It should be noted that only a user who wishes to receive tokens from other purses' holders of the family must have his purse registered.

The first operation, called the token depositing process, will now be described in view of FIG. 4.

When a user A who owns a purse P$_A$ desires to transfer tokens to another purse, the user A has first to insert his smart card corresponding to purse P$_A$ in a client and to choose, via the user interface of the client, the application for transferring tokens to another purse. Then, the client on which the user A is connected (that means, on which the smart card representing the purse P$_A$ is inserted) sends a request to the server (Message "getPurseList" sent at step 50-FIG. 4) which sends back a response with the list of all registered purses (designating those which can receive tokens) in a message "ListPurses(m,PID$_1$, . . . ,PID$_m$)" (step 51) where "m" designates the number of registered purses and "PID$_1$, . . . , PID$_m$" designate the different purse's identifiers of the list of registered purses. Once the client receives this list, it displays it to the user A who can choose the recipient P$_B$ of the token transfer and the amount to be transferred.

Next, the client sends to the server a message "Deposit (amount,purse_recipient,purse_sender)" (at step 52) wherein "amount" corresponds to a number of units of money to transfer, "purse_recipient" is the recipient's purse identifier (here, it corresponds to PID$_B$) and "purse_sender" is an information about the sender of the tokens. Advantageously this information will be the sender's purse identifier PID$_A$ or the name of user A. When the server receives this message, it adds a token T$_i$=(amount,P$_A$) in the list of tokens stored in the entry corresponding to purse P$_B$. In a simplified implementation of the invention, the "purse_sender" information can be omitted from the "Deposit( )" message. In this case, the token stored in the server will only contain the "amount" information.

Now, the second operation, called the token receiving process, will be described in view of FIG. 5.

This process is executed each time a user B enters his smart card, corresponding to purse P$_B$, in a client and is used to contact the server in order to download tokens stored in the entry corresponding to purse P$_B$ in the server.

The two following messages will be exchanged at steps 60, 61, 60', 61' as long as there are remaining tokens stored in the server's entry corresponding to purse P$_B$.

The first message "GetNextToken(purse_id)" is sent by the client to the server (steps 60, 60') with "purse_id" being the identifier of the purse (here PID$_B$). On receipt of this message, the server copies the first token of the list attached to the purse_id entry and deletes this token. Then, it sends to the client (at steps 61, 61') the second message "Token (purse-id,amount)", where "purse_id" is the identifier of the purse (here PID$_B$) and "amount" indicates the amount of money to be transferred. When the client receives this second message, it credits the purse P$_B$ with the amount indicated.

A—Security Issues

Before participating in e-commerce activities as well as inter-purses operations with the electronic wallet system of the invention, the user must be sure that the system cannot be easily attacked and for this purpose, solutions providing a sufficient level of security have to be proposed.

We will first present the security requirements concerning the inter-purses operations supplied by the electronic wallet system. Then, based on these security requirements, the security solutions proposed by the invention, which ensure a sufficient level of security of the electronic wallet system, will be presented.

The main threats on the electronic wallet system can be listed as follows:

the purses registered in the server belong to outsiders of the family;
money is illegally minted;
tokens are lost forever during the inter-purses operations;
tokens intended for a user are stolen by another user, either inside or outside the family.

The invention therefore proposes security solutions to reduce these threats and meet the following security requirements:

only the purses owned by the family members can be registered in the server (of course, this requirement is not strictly limited to real members of a family and can be extended to people "considered as" family members);
the money minting should be prevented;
the tokens lost during inter-purses operations should be detected and recovered;
the tokens should be transferred to the destined person.

1. Configuration

Each family possesses a set of secret keys SK, SKA, SKT and SKR (acronyms are explained in Table 1 below) shared by the purses owned by the family members. These secret keys are sealed inside the purses (i.e. the smart cards) before their delivery and only the electronic wallet system manufacturer knows them.

We suppose in the following that a family has p purses (i.e p smart cards) and that m purses are registered in the server of the electronic wallet system (with $m \leq p$).

According to the invention, all the secrets which are used to secure the inter-purses operations of the electronic wallet system are only stored inside the smart cards representing the purses of the electronic wallet system.

Each purse $P_i$ (i.e. each smart card $SCard_1$ to $SCard_p$) contains the information listed in Table 1 below (with $1 \leq i \leq p$):

TABLE 1

| Acronym/Abbreviation | Meaning |
| --- | --- |
| SK | Key used for transferring tokens |
| SKA | Key used for purses registration |
| SKT | Key used for secure transactions |
| SKR | Key used for lost tokens recovery |
| ReceiveTrace ($PID_i$) | Traces remembering the tokens received from other purses, used for lost tokens recovery (explained latter in section B) |
| DepositTrace ($PID_i$, $PID_j$) | Traces remembering the tokens deposited by purse $P_i$ to the registered purse whose identifier is $PID_j$ (with $1 \leq j \leq m$), used for lost tokens recovery (as explained latter in section B) |
| $PID_i$ | Unique purse identifier |
| Counter | Amount of units of money contained in the purse |
| $TransID_i^P$ | Transaction identifier of tokens received by the purse, set to zero at the initialization of the electronic wallet system by the manufacturer |

The server contains a list of entries. Each entry corresponds to a registered purse whose purse identifier is $PID_i$, with $1 \leq i \leq m$. An entry contains the information listed in Table 2 below:

TABLE 2

| Information | Meaning |
| --- | --- |
| $S_{SKA}(PID_i)$ | Signed identifier of the registered purse $PID_i$. |
| $S_{SKT}(PID_i, TransID_i^S)$ | Signed transaction identifier of tokens deposited for the purse $PID_i$. |
| Tokens | A list of tokens intended for purse $PID_i$, received from other purses. |
| $Index_i$ | The number of tokens still left on the server for purse $PID_i$. |

It should be noted that the notation $S_K(M)$ will be used throughout the specification to designate "M ∥ Sign(K, M)" where "Sign(K, M)" is the signature or the MAC (standing for "Message Authentication Code", more details about which can be found in <<(Handbook of applied cryptography, Alfred J. Menezes, Paul C. van Oorschot, Scott A. Vanstone, 1997, page 325>>) of the message M using the key K and where "∥" represents the concatenation operator.

2. Purse Registration

As mentioned previously, in order to receive tokens from other purses, a purse must be registered in the server which is responsible for inter-purses operations.

So, before a user B, for example a children, can receive tokens from a user A, for example one of his/her parents, the purse of user B must be registered in the server.

In a preferred embodiment of the invention, this registration phase will ensure that only members of the family can have their purse registered in the server. Of course this is not strictly limited to real members of the family and the purse registration can be extended to people "considered as" members of the family.

It is therefore proposed that a given member of the family has the root rights to register the purses of all members of the family. Unlike the other members of the family, only this privileged user, called the "root user" in the following, will be authorized to execute the registration phase. In the electronic wallet system, the root user is considered as a "third trust party" which will ensure that all registered purses are owned by a member of the family.

In order to implement this functionality, a special smart card for which the PIN (Personal Identification Number) has the administration rights ("root" rights) is provided by the electronic wallet system manufacturer together with the other entities of the system. This special card will be referred to as the "root card" in the following. A "rootPIN" is stored in the root card to provide a way to verify that the user who attempts to execute the registration phase is the root user. Moreover, in a preferred embodiment, the software for executing this registration phase is preferably only contained in the server and this registration phase is always executed on the server.

In an alternative embodiment, this root card may be one of the purses of the electronic wallet system.

Figure 6:
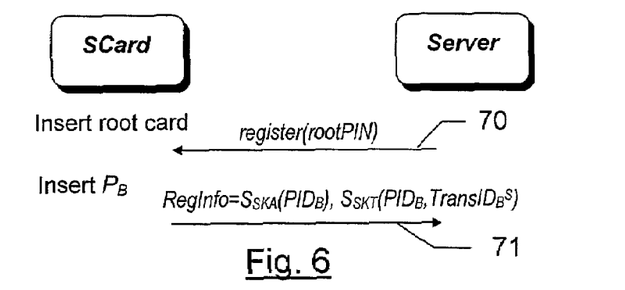
FIG. 6 illustrates a process for registering one purse in the server of the electronic wallet system.

Now, we will describe more precisely, in view of FIG. 6, how this registration phase is executed according to a preferred embodiment. We suppose that user X is the root user. When X wants to initiate the registration process, X has first to insert the root card in the server. Then he enters rootPIN to prove that he is indeed the root user in order to start the registration process.

This entered rootPIN is sent by the server to the smart card (the root card) in a message "register(rootPIN)" (at step 70).

Then, the root card verifies that the root PIN received matches the one stored in the card.

The rootPIN is used to ensure that only the authorized person has the right to register the purses of the family. This ensures that only the purses owned by the family members can be registered in the server.

Then, if the verification is positive, the root user will be able to remove the root card and to insert the smart card corresponding to the purse he wants to register in the server, for example purse $P_B$ belonging to user B.

The smart card corresponding to $P_B$ creates a signed purse identifier $S_{SKA}(PID_B)$ and a signed transaction identifier $S_{SKT}(PID_B, TransID_B^S)$ where $TransID_B^S$ is initialized with $TransID_B^P$ stored in $P_B$. It should be noted that, at the installation of the system, $TransID_B^S$ is initialized at 0.

$S_{SKA}(PID_B)$ prevents the purse identifiers $PID_B$ to be modified during the transmission or when it is stored in the server.

$S_{SKT}(PID_B, TransID_B^S)$ aims at initializing the transaction identifier $TransID_B^S$ of tokens deposited for the purse $P_B$. The $TransID_B^S$ is associated to the $PID_B$ and signed using the secret key SKT. This prevents the $TransID_B^S$ to be modified during the transmission or when it is stored in the server.

The smart card sends this information to the server in a message "RegInfo" (step 71). Then, the server creates an entry for the purse $P_B$ and stores the information contained in RegInfo in this entry.

These steps are repeated for each one of the m purses to be registered.

It should be noted that the modification of either $PID_B$ or $TransID_B^S$ stored in one entry of the server would cause the tokens to be refused by the purse for which they are intended, therefore resulting in the loss of these tokens.

In addition, this registration process should be executed preferably at the very beginning of the electronic wallet system installation. It should also be noted that, in the case that the server loses the information of registered purses due to technical failure or vandalism attacks, the purses should be registered again using the same process.

In an alternative embodiment of the registration process, the root card contains the purse identifiers $PID_i$ of all the purses of the electronic wallet system as well as the secret keys SKA and SKT. In this particular embodiment, the registration process is executed at the installation of the system and it is not necessary to enter all the smart cards corresponding to the purses of the electronic wallet system in the server. The RegInfo message sent at step 71 for each registered purse is constructed by the root card thanks to the information it contains with the signed transaction identifier initialized at zero. RegInfo therefore contains, for example for purse $P_B$:

RegInfo=$S_{SKA}(PID_B)$, $S_{SKT}(PID_B, 0)$.

This alternative registration process can only be used at the installation of the system and the process which has been described previously according to a preferred embodiment is still used when it is necessary to register again one purse (for example when the server has lost the information regarding this purse).

3. Token Depositing Process

Figure 4:
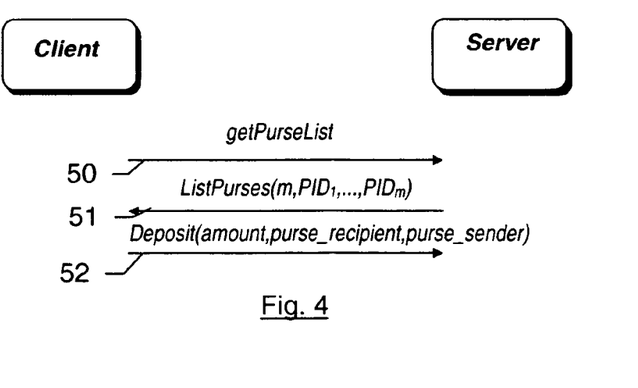
FIG. 4 illustrates a first process involved in the transfer of tokens from one purse of the electronic wallet system to another.

In FIG. 4, we have illustrated the general principle of the Token depositing process. We will now describe an improved secure protocol used in the first process of the inter-purses operations and illustrated in FIG. 7.

Figure 7:
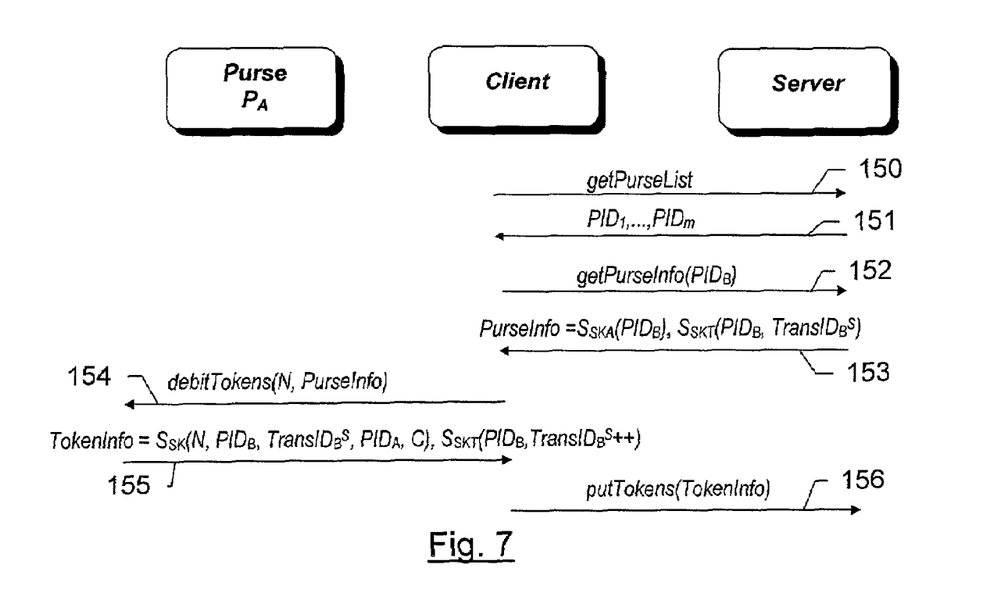
FIG. 7 illustrates the first process for transferring tokens from one purse to another in which security features have been added.

We suppose that a user A having a purse $P_A$ wants to deposit some tokens for another purse $P_B$. The user A first inserts the smart card corresponding to purse $P_A$ in a client and selects a Token depositing application on the client. The client then sends to the server a message "getPurseList" at step 150 to request the list of the registered purses.

On receipt of this message, the server sends back to the client the list of the identifiers of the registered purses in a message "$PID_1, \ldots, PID_m$" at step 151. This list is presented to the user by the client and the user chooses the recipient purse identifier $PID_B$ and enters the number N of units of money he wants to transfer to the recipient purse.

The client then sends a message "getPurseInfo($PID_B$)" to the server at step 152 to request some information about the chosen recipient purse. Next, the server constructs a "PurseInfo" message containing local data stored in the entry corresponding to $PID_B$ on the server. The "PurseInfo" message contains the signed purse identifier $S_{SKA}(PID_B)$ and the signed transaction identifier $S_{SKT}(PID_B, TransID_B^S)$ and is sent to the client at step 153. Thanks to the signatures $S_{SKA}$ and $S_{SKT}$, both the $PID_B$ and the $TransID_B^S$ cannot be modified during the transmission.

$TransID_B^S$ is an ever increasing integer, stored in the server's local data, in the entry corresponding to the registered purse $P_B$. It memories the number of tokens deposited for purse $P_B$ since the registration of the purse $P_B$. The deposited tokens are temporarily stored in the server and will be transferred to the purse $P_B$ through the "token receiving" process at the next use of purse $P_B$. As previously stated, the transaction identifier $TransID_B^S$ is initialized with the value of the purse transaction identifier $TransID_B^P$ stored in the purse during the registration phase (which is equal to zero at the installation of the system). It is then incremented when tokens are deposited on the server for purse $P_B$.

When the client receives the "PurseInfo" message, it sends a message "debitTokens(N, PurseInfo)" to the smart card corresponding to purse $P_A$ (which is inserted in the client) at step 154. This message will debit the counter of purse $P_A$ of N units of money to be transferred to purse $P_B$.

On receipt of the "debitTokens(N, PurseInfo)" message, the smart card (corresponding to purse $P_A$) executes the following operations:

it checks the signature of the purse identifier $PID_B$ using key SKA;

it checks the signature of the transaction identifier $TransID_B^S$ using key SKT;

If these verifications are positive, then it generates a random number C;

it decrements the purse $P_A$ counter by N units;

it creates a signed token "$S_{SK}(N, PID_B, TransID_B^S, PID_A, C)$" meaning that N units of money are intended for purse $P_B$ from purse $P_A$;

it increments the received transaction identifier $TransID_B^S$ and creates a signed incremented transaction identifier "$S_{SKT}(TransID_B^S++)$"; and it sends to the client the signed token and the signed incremented transaction identifier in a message "TokenInfo" at step 155.

Since the token is signed using the secret key SK shared by the purses in the family, an attacker cannot forge or modify the token. In addition, since $PID_B$ is included in the token representation, an attacker cannot steal tokens intended for another family member. The transaction identifier $TransID_B^S$ is introduced in the token to prevent a replay attack and the random number C contained in the token is used to counter an attack that would compromise the secret key SK of the smart card by analyzing the output cipher texts.

Moreover, the information $PID_A$ contained in the token may be omitted in an alternative simplified embodiment.

When the client receives the "TokenInfo" message, it forwards it to the server at step 156 in a command message "putTokens(TokenInfo)". On receipt of this command, the server stores the corresponding token in the entry of purse $P_B$, it increments the index and it updates the signed transaction identifier $TransID_B^S$ with the incremented transaction identifier received in the "TokenInfo" message.

4. Token Receiving Process

Figure 5:
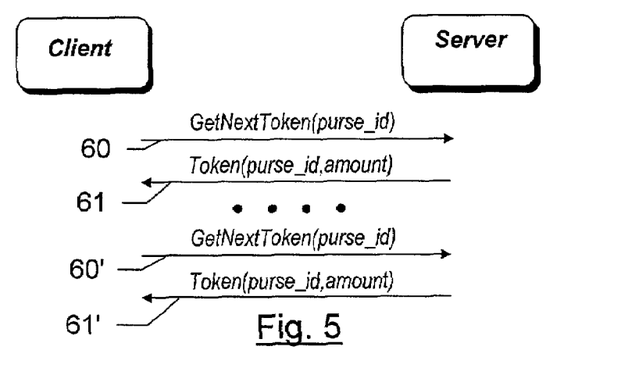
FIG. 5 illustrates a second process involved in the transfer of tokens from one purse of the electronic wallet system to another.

The general principle of the Token receiving process has been described in view of FIG. 5. We will now present an improved secure protocol used in the second process of the inter-purses operations and illustrated in FIG. 8.

Figure 8:
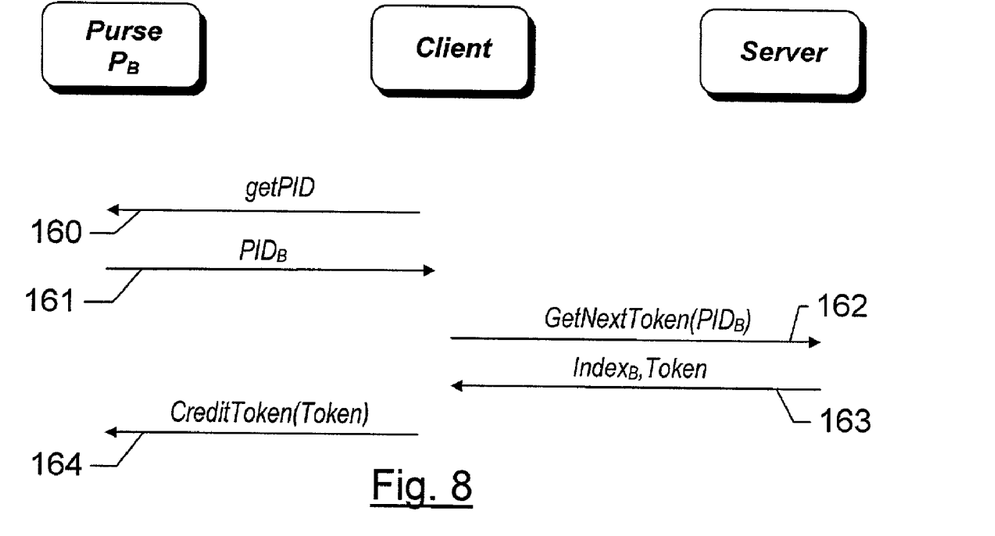
FIG. 8 illustrates the second process for transferring tokens from one purse to another in which security features have been added.

This process is executed each time a user inserts his/her smart card representing a purse in a client. Here, we suppose that the user has a purse $P_B$ whose identifier is $PID_B$.

The first step 160 consists for the client in sending a message "getPID" to the smart card to request the purse identifier. The smart card responds to this request by sending, at step 161, the purse identifier $PID_B$ to the client. Then, the client sends a message "GetNextToken($PID_B$)" to the server (step 162) to fetch the next token stored on the server.

On receipt of this message, the server checks whether tokens are stored in the entry corresponding to purse $PID_B$. If no tokens have been deposited for purse $PID_B$, then the server sends "−1" to the client (at step 163). Otherwise:

- it fetches the first token (in fact a signed token "$T_1 = S_{SK}(N, PID_B, TransID_B^S, PID_A, C)$") stored in the entry corresponding to $P_B$;
- it decrements the $Index_B$ of entry $P_B$, the $Index_B$ indicating the number of tokens still left on entry $P_B$ of the server; and
- it sends to the client the $Index_B$ and the token at step 163.

If the client has not received "−1" at step 163, then it forwards the token to the purse $P_B$ in a command message "CreditToken(Token)" sent at step 164.

When the purse $P_B$ receives tokens through creditTokens command, it checks the validity of the tokens by verifying if the following conditions hold:

$V_{SK}(S_{SK}(N, PID_B, TransID_B^S, PID_A, C)) = N, PID, TransID_B^S, PID_A$; C (verification of the signature of the received token); and $TransID_B^S \geq TransID_B^P$ where the secret key SK, the purse identifier PID and the purse transaction identifier $TransID_B^P$ come from the user's purse $P_B$; where the challenge C, the purse sender identifier $PID_A$, the server transaction identifier $TransID_B^S$ and the amount of units of money N are copied from the received token and where "$V_{SK}(S_{SK}(M)) = M$" if the message M has been signed with the key SK.

The purse transaction identifier $TransID_B^P$ is an ever increasing integer, stored in the purse $P_B$. It memories the number of tokens received by the purse $P_B$. These tokens are downloaded from the server. The purse transaction identifier is initialized at 0 when the purse is registered by the electronic wallet system manufacturer. Upon reception of tokens, the purse verifies if $TransID_B^P$ is equal to or less than the server transaction identifier ($TransID_B^S$) contained in the token. Then, if this verification and the verification of the signature of the token are positive, the purse increments its counter by N and it updates its transaction identifier $TransID_B^P$ to $TransID_B^S + 1$. Thanks to this feature, the same tokens can never be used more than once to credit the purse.

Next, steps 162 to 164, followed by verifications and actions described above performed in the purse $P_B$, are repeated while $Index_i$ (received at step 163) is greater than zero.

B—Lost Tokens Recovery

Based on the security solution described previously, it is possible to ensure that only the purses owned by the family members can be registered in the electronic wallet system. Moreover tokens can never be forged, modified, replayed or stolen during the inter-purses operations.

However, no solution has been presented to prevent tokens to be lost. Tokens can be lost due to some accidental errors such as technical failure of local network or Set-Top Boxes of the electronic wallet system. It can also be caused by vandalism attacks like deleting tokens stored in server or in transmission, etc.

Therefore, in a preferred embodiment of the invention, an audit process allowing to identify and recover lost tokens will be implemented in the electronic wallet system.

Figure 9:
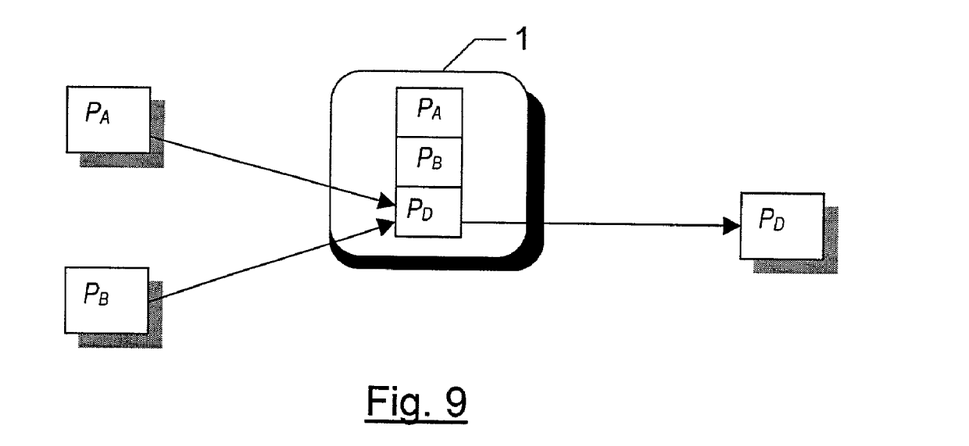
FIG. 9 is an example illustrating a lost token recovery process.

The tokens are defined as being lost if and only if they have been debited from a purse $P_A$ or $P_B$, but they are never credited to the purse $P_D$. Here we use an example to illustrate the process where $P_A$ and $P_B$ transfer tokens to $P_D$ through the server 1 as illustrated in FIG. 9.

1. Starting of the Process

The audit process starts when the owner of $P_D$ claims (falsely or truly) that he has not received tokens from $P_A$ or $P_B$. Another alternative solution is that the process is called periodically.

The audit is processed locally by the root user of the electronic wallet system. He has to collect all the purses of the family (i.e. all the smart cards representing the purses of the family members). The process is executed by the server of the electronic wallet system.

During the audit process, the "transaction traces" stored in all the purses ($P_A$, $P_B$, $P_D$) will be studied in order to recover the lost tokens.

2. Transaction Traces for Audit

As for purses $P_A$ or $P_B$, they store traces of "Token depositing" transactions intended for the purse $P_D$, noted as:

DepositTraces($P_X$, $P_D$)=<$TransID_{XD}$, sum_of_deposited$_{XD}$>

$TransID_{XD}$ is an inter purse transaction identifier and sum_of_deposited$_{XD}$ is an inter purse deposit count.

In other words, each time when the purse $P_X$ deposits 1 token containing N units of money and the server transaction identifier $TransID_D^S$ to the purse $P_D$, $TransID_{XD}$ is updated to $TransID_D^S$ and N is added to sum_of_deposited$_{XD}$. The definition of inter-purses operations (Token depositing and Token receiving process) ensures that $TransID_{XD}$ keeps an ever increasing order. Note that X is either A or B in our example.

As for purses $P_D$, it stores traces of "Token receiving" transactions originated from purses $P_A$ and $P_B$, noted as:

ReceiveTraces($P_D$)= sum_of_received$_D$ sum_of_received$_D$ is a receive count.

In other words, each time when the purse $P_D$ recovers 1 token containing N units of money sent by the purse $P_X$, N is added to sum_of_received$_D$.

3. Identify Lost Tokens from Transaction Traces

From the definition of inter-purses operations, it is possible to prove that:

- $\Sigma_X$ sum_of_deposited$_{XD} \geq$ sum_of_received$_D$ always holds, meaning that token minting is impossible;
- if $\Sigma_X$ sum_of_deposited$_{XD}$=sum_of_received$_D$ then no token has been lost;

if $\Sigma_X$ sum_of_deposited$_{XD}$>sum_of_received$_D$ then some tokens have been lost.

The amount of lost tokens intended for $P_D$ is equal to:

$$\text{LostTokens}(P_D) = \Sigma_X \text{sum\_of\_deposited}_{XD} - \text{sum\_of\_received}_D$$

4. Recovery of Lost Tokens

In order to recover the lost tokens intended for $P_D$ (containing the current purse transaction identifier TransID$_D^P$), four operations should be done:

first, the counter of $P_D$ is credited by LostTokens($P_D$);
second, the purse transaction identifier of $P_D$ is updated to Max(TransID$_D^P$, TransID$_{XD}$+1);
third, sum_of_received$_D$ is set to 0;
and fourth, for the purse $P_X$, sum_of_deposited$_{XD}$ is set to 0 where X is A or B in our example.

It should be noted that the second operation aims at preventing the following attack: the holder of $P_D$ keeps the tokens intended for him and claims the loss of those tokens. If the transaction identifier of $P_D$ was not updated, he would be able to recover those tokens through the "Token receiving" operation. This attack would cause the minting of money.

5. Secure Audit Process

Figure 10:
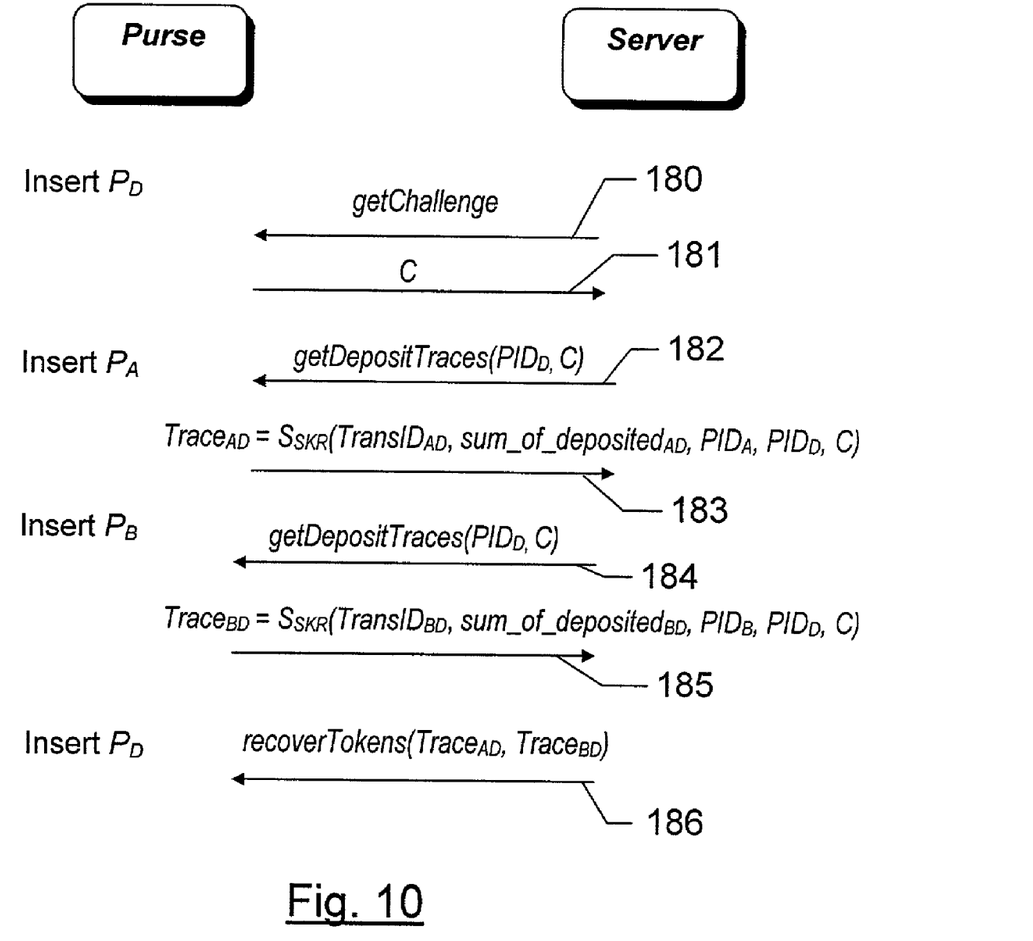
FIG. 10 describes a lost token recovery process.

FIG. 10 illustrates the secure audit process which allows to recover lost tokens intended for the purse $P_D$ with the help of transaction traces stored in the purses of the family.

In a first step (not represented in FIG. 10), as during the registration process, the root user has to insert the root card in the server and to enter the root PIN before being allowed to start the secure audit process.

Then, in a second step, the root user inserts purse $P_D$ in the server which sends to purse $P_D$ a message "getChallenge" at step 180 requesting the purse $P_D$ to generate a random number C. On receipt of this message, $P_D$ generates and stores a challenge C and it sends C to the server at step 181. This random number C is stored in both $P_D$ and the server. Thanks to C, it will not be possible to replay messages exchanged during one execution of the process during another execution of the audit process.

Then the root user will insert all the other purses of the family ($P_A$ and $P_B$ in our example). For each purse $P_X$ inserted in the server, the server will first send a message "getDepositTraces(PID$_D$, C)" to the purse $P_X$ (steps 182 and 184 in FIG. 10). In response to this message, the purse $P_X$ generates the following message using the "DepositTrace (PID$_X$, PID$_D$)" field stored in purse $P_X$:

$$\text{Trace}_{XD} = S_{SKR}(\text{TransID}_{XD}, \text{sum\_of\_deposited}_{XD}, \text{PID}_X, \text{PID}_D, C)$$

which is sent to the server at steps 183, 185.

Then, the sum_of_deposited$_{XD}$ field of DepositTrace (PID$_X$, PID$_D$) stored in $P_X$ is set to 0 when the purse $P_X$ sends the Trace$_{XD}$ message to the server.

The Trace$_{XD}$ message is signed using a secret key SKR by the purse $P_X$ which has deposited tokens for $P_D$. Therefore, nobody can forge/modify this message. SKR is a secret key used in the lost tokens recovery process. Like other secret keys, it is stored in the smart cards representing the purses by the electronic wallet system manufacturer and shared by the family members.

The random number C (received by the purse $P_X$ in the "getDepositTrace" message sent at step 182, 184) is introduced in the Trace$_{XD}$ message to counter a possible replay attack (e.g. replaying recoverTokens message explained below).

All the Trace$_{XD}$ messages received by the server are stored in the entry corresponding to purse $P_D$ in the server.

Then, when the root user has successively introduced and removed all other purses of the family in the server, he finally reintroduced purse $P_D$ in the server.

Next, at step 186, all the Trace$_{XD}$ messages are sent to $P_D$ through a recoverTokens command.

Upon reception of Trace$_{XD}$ by $P_D$, the signature of Trace$_{XD}$ is checked by verifying if the following condition holds:

$$V_{SKR}(S_{SKR}(\text{TransID}_{XD}, \text{sum\_of\_deposited}_{XD}, \text{PID}_X, \text{PID}_D, C)) == \text{TransID}_{XD}, \text{sum\_of\_deposited}_{XD}, \text{PID}_X, \text{PID}, C;$$

where the secret key SKR, the purse identifier PID and the challenge C come from the purse $P_D$;
where TransID$_{XD}$, sum_of_deposited$_{XD}$ and PID$_X$ are copied from the received Trace$_{XD}$ message and
where "$V_{SKR}(S_{SKR}(M)) == M$" if the message M has been signed with the key SKR.

Then, if the verification is positive, the following calculation is made by purse $P_D$:

$$\text{LostTokens}(P_D) = \Sigma_X \text{sum\_of\_deposited}_{XD} - \text{sum\_of\_received}_D = \text{sum\_of\_deposited}_{AD} + \text{sum\_of\_deposited}_{BD} - \text{sum\_of\_received}_D$$

where sum_of_received$_D$ is taken from the ReceiveTraces ($P_D$) stored in $P_D$.

The result of this calculation gives the number N of units of money which have been lost due to the loss of tokens. This amount N is therefore credited to the counter of $P_D$.

Then, as explained in point 4. above, the transaction identifier of $P_D$ is updated to:

$$\text{TransID}_D^P = \text{Max}(\text{TransID}_D^P, \text{TransID}_{AB}+1, \text{TransID}_{BD}+1).$$

Finally, the sum_of_received$_D$ field of ReceiveTraces($P_D$) is set to 0.

Moreover, it should be noted that it is the root user's responsibility to gather all the purses of the family before launching the secure audit process which has been described here. Otherwise, some lost tokens would not be recovered.

C—Remote Access Mode

Figure 11:
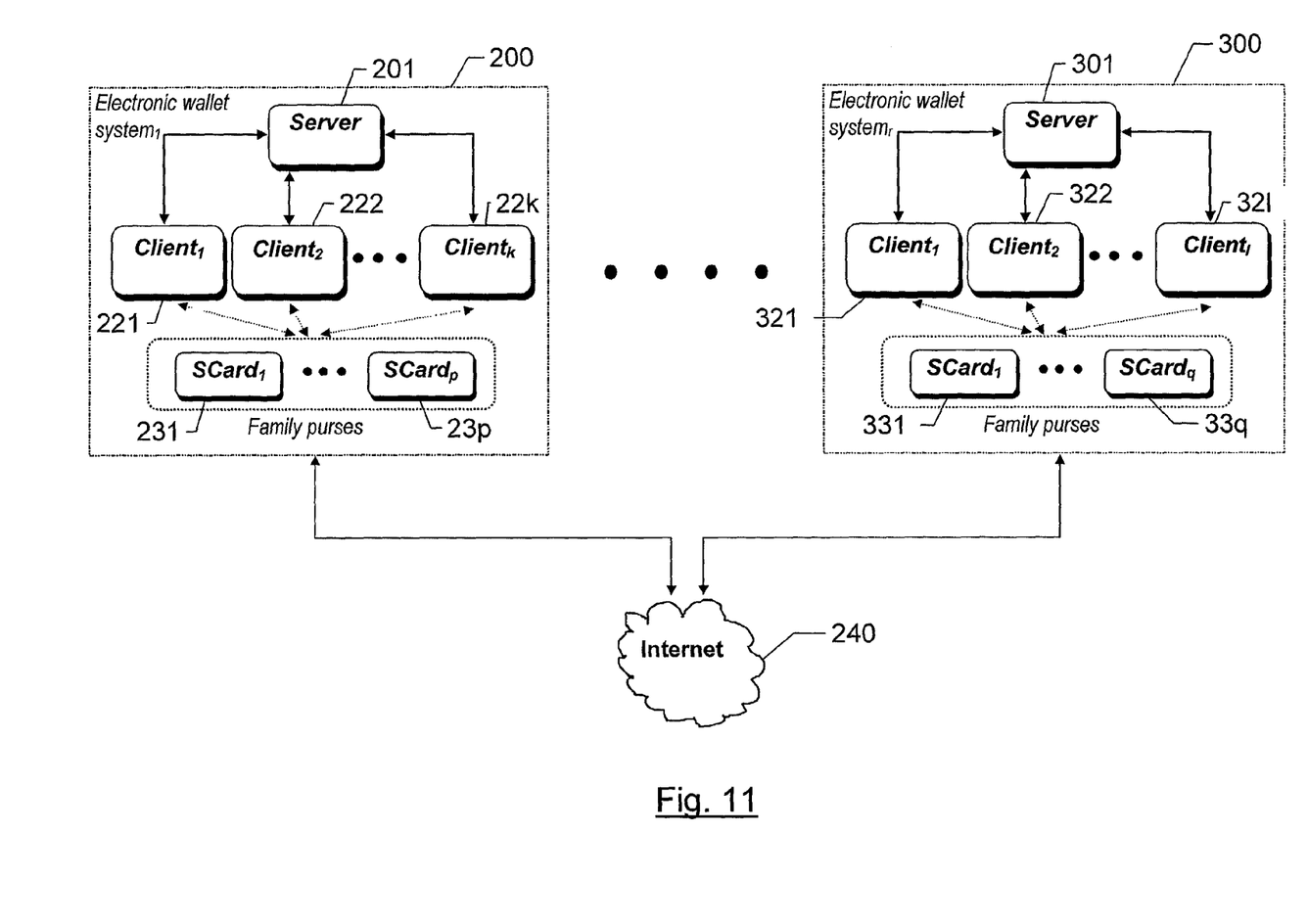
FIG. 11 illustrates an interconnection of electronic wallet systems through an open network.

Thanks to the architecture of the electronic wallet system of the invention presented in FIG. 1, it is possible to interconnect several electronic wallet systems 200 . . . 300 through an open network 240 as illustrated in FIG. 11.

In FIG. 11, we have represented:

a first Electronic wallet system$_1$ 200 comprising a Server 201, a set of Clients 221 to 22k and a set of p smart cards representing purses 231 to 23p of a first family; and another Electronic wallet system$_r$ 300 comprising a Server 301, a set of Clients 321 to 321 and a set of q smart cards representing purses 331 to 33q of another family.

The servers 201, 301 and the clients 221-22k, 321-321 are all connected to the open network 240 (e.g. Internet).

With this extended architecture, it is now possible to perform inter-purses operations between several local electronic wallet systems and thus each inter-purses operation presented in sections A-3. and A-4. above can be made locally or remotely depending on the recipient purse (in the case of Token depositing process) or on the locality of the client (in the case of Token receiving process).

More precisely, a user A can transfer tokens from his purse towards another purse of the family whatever the compliant electronic wallet system he is connected on and he can receive tokens from any purse of the family each time he inserts the smart card representing his purse on a client of a compliant electronic wallet system, this system being at home or not.

This feature is made possible thanks to the fact that each electronic wallet system server is connected to an open network such as Internet and has a unique IP address ("IP" standing for "Internet Protocol") which identifies the server on the network and which is known by all family members. This IP address of the server is preferably stored in the smart cards of the family, for example at the initialization of the system.

We will now describe how the remote inter-purses operations are performed based on the secure protocols that have been described previously (in sections A-3. and A-4.) to perform local inter-purses operations.

1. Remote Token Depositing Process

Figure 12:
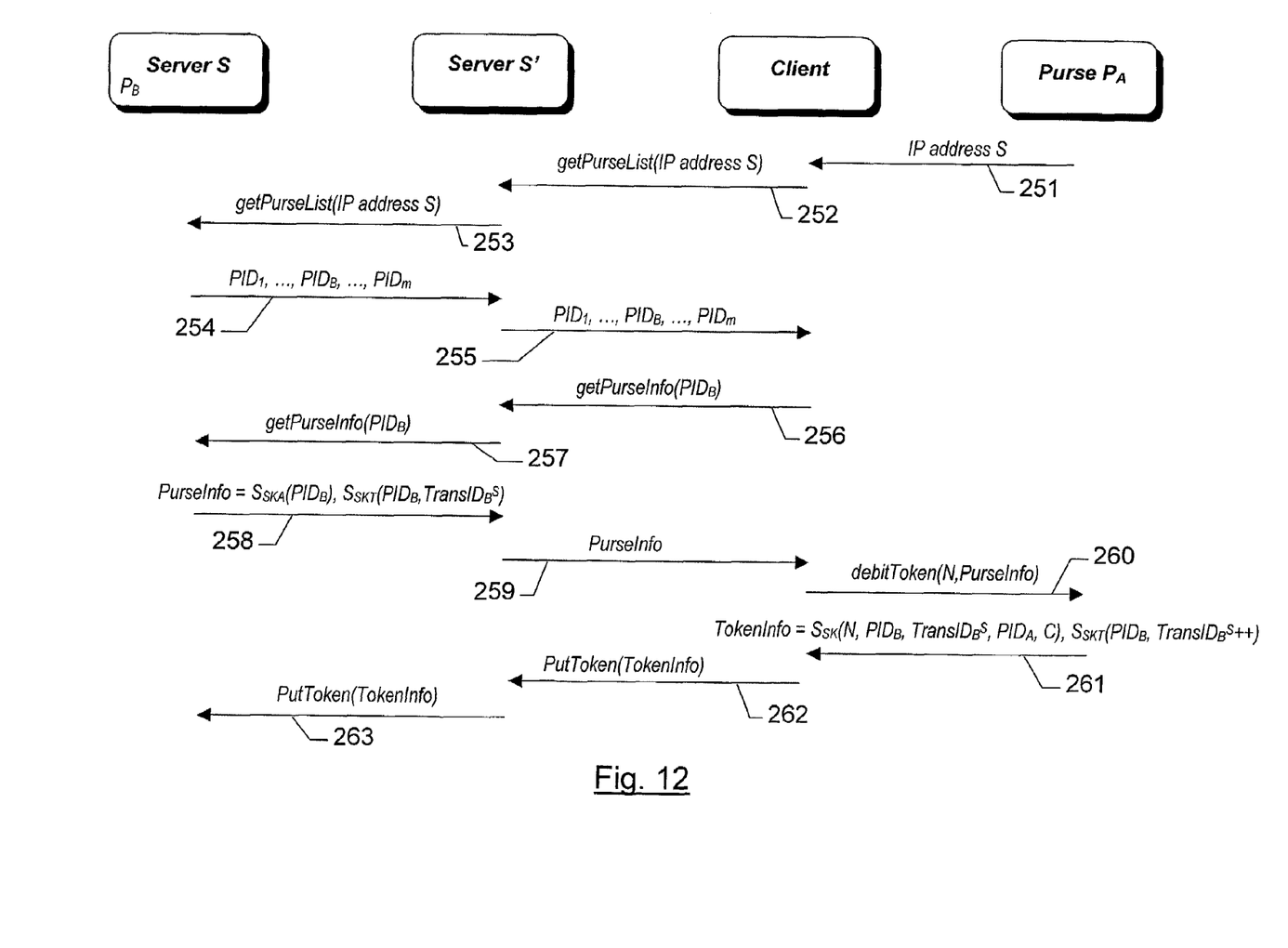
FIGS. 12 and 13 illustrate a remote process for transferring tokens from one purse to another in the case of electronic wallet systems interconnected through an open network as shown in FIG. 11.

This process is illustrated in FIG. 12.

We suppose that a user A having a purse $P_A$ belonging to a first electronic wallet system wants to deposit a token containing N units of money on a purse $P_B$ which is registered on a server S belonging to the same electronic wallet system.

The user A inserts his smart card representing purse $P_A$ in a client connected to a local server S'.

At first, at step 251, the IP address of the server S which is stored in $P_A$ is sent to the client. The client then checks whether the received IP address is or is not the one of the local server S'.

If S and S' are the same server, then the local mode will be chosen and the process will be the same as the one which has been described previously in view of FIG. 7. Otherwise, if S' belongs to a different electronic wallet system than S, the remote mode will be chosen.

Here, we suppose that S and S' are different servers of different electronic wallet systems and that the remote mode has been chosen.

In this case, at the next step 252, the client sends to the server S' a first message "getPurseList(IP address S)". This message is the same as the one sent at step 150 in FIG. 7 (as the other messages which will follow) except the fact that, in remote mode, the IP address of the server S on which is registered the recipient purse $P_B$ is added to the message. At the following step 253, this message is forwarded to the server S by the server S' through the open network 240 in a known manner thanks to the IP address of the server S.

On receipt of this message, the server S responds by sending (at step 254) the list of registered purses "$PID_1, \ldots, PID_B, \ldots PID_m$" to the server S' which forwards this message to the client on which the user A is connected at step 255.

The client displays the received list to the user A who can choose the recipient purse $P_B$ and indicate the amount N of money to be transferred to $P_B$. Then, at step 256, a message "getPurseInfo($PID_B$)" is sent by the client to the server S' (as in step 152 in FIG. 7) which forwards it to the server S at step 257. The server S responds, at step 258, by sending a "PurseInfo" message to the server S' (as in step 153 of FIG. 7), the "PurseInfo" message being forwarded to the client on which the user A is connected at step 259.

On receipt of this "PurseInfo" message, at step 260, the client sends to the smart card representing purse $P_A$ a "debitToken(N, PurseInfo)" message similar to the message sent at step 154 in FIG. 7.

Next, the smart card (or purse $P_A$) verifies the content of "PurseInfo" by checking the signatures of the purse identifier $PID_B$ and of the transaction identifier $TransID_B^S$ using keys SKA and SKT.

It should be noted that each electronic wallet system has its own set of secret keys SK, SKA, SKT and SKR which are embedded in the purses of the family members and which are different from one electronic wallet system to the other. In this case, as the purse $P_A$ belongs to the same electronic wallet system as the purse $P_B$, they both share the same set of secret keys SK, SKA, SKT and SKR and $P_A$ can verify the content of the "PurseInfo" message.

Returning to FIG. 12, if the verification of the content of "PurseInfo" is positive, then the purse $P_A$ sends to the client a signed token and a signed incremented transaction identifier in a message "TokenInfo" at step 261 (similar to the message sent at step 155 in FIG. 7).

When the client receives the "TokenInfo" message, it sends it to the server S' at step 262 in a command message "putTokens(TokenInfo)", this message being forwarded by the server S' to the server S at step 263.

On receipt of this command, the server S stores the corresponding token in the entry of purse $P_B$ and performs the same actions as described previously in view of FIG. 7, after step 156.

2. Remote Token Receiving Process

Figure 13:
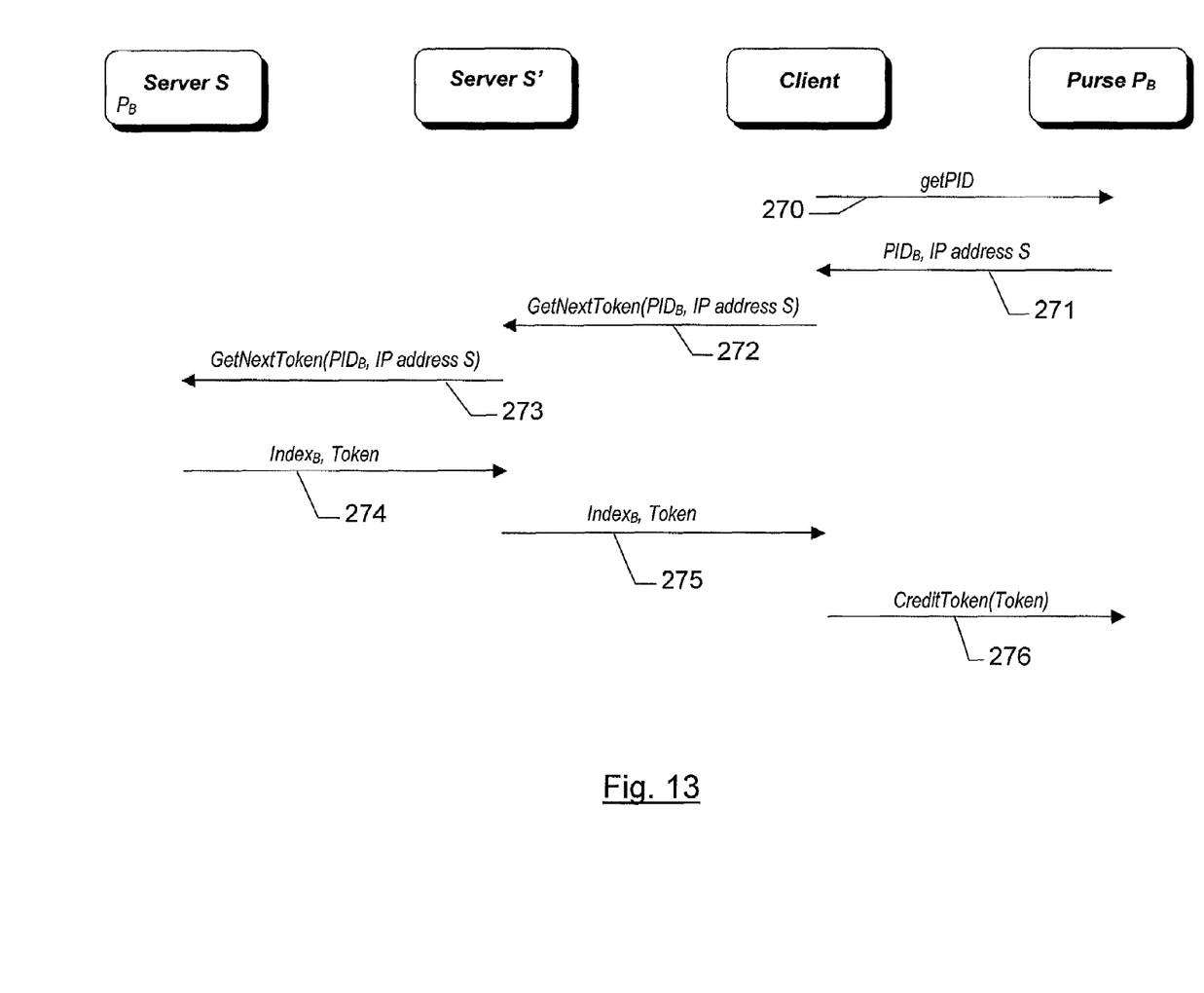

This process is illustrated in FIG. 13.

We suppose now that a user B has his purse $P_B$ registered in a server S of a first electronic wallet system and that B wants to receive the tokens which have been transferred to his purse and which are registered on the server S.

The token receiving process is either launched as soon as a user inserts his smart card representing a purse in a client connected to a local server S' or when the user has chosen, through the user interface of the client, to launch this process. Here, we suppose that the user B has inserted his purse $P_B$ in the client and that the token receiving process is launched.

The first step 270 consists in the sending of a message "getPID" by the client to the smart card representing purse $P_B$. The purse responds by sending its purse identifier and the IP address of the server S on which it is registered (message "$PID_B$, IP address S" sent at step 271).

When the client receives this message, it checks whether the received IP address is the one of the local server S' on which it is connected or not to choose between the local mode and the remote mode. If S and S' are the same server, then the local mode will be chosen and the token receiving process will be the same as the one described previously in view of FIG. 8. Otherwise, the remote mode will be chosen.

In the following, we will suppose that S and S' are different servers of different electronic wallet systems and that the remote mode has been chosen for the token receiving process.

In this case, the client sends to the local server S' a message "GetNextToken($PID_B$, IP address S)" at step 272. When the server S' receives this message, it checks the IP address contained in the message and if the IP address is different from its own, then it forwards the message through the open network 240 to the server S at step 273.

When the server S receives this message, it will act in the same manner as what has been described previously in view of FIG. 8 when the server receives message "GetNextToken ($PID_B$)" at step 162. If at least one token has been deposited for purse $P_B$ on the server S, it will send back to the server S' a message "$Index_B$, Token" at step 274 (message similar to the message sent at step 163 in FIG. 8) and the server S' will forward this message to the client on which the user B is connected at step 275.

Next, at step 276, the client forwards the token to the purse P$_B$ in a command message "CreditToken(token)" similar to the one sent at step 164 in FIG. 8. The smart card representing purse P$_B$ will then do the same verifications (thanks to the secret key SK stored in the smart card) and actions as the ones that have been described in view of FIG. 8, after step 164.

Steps 272 to 276, followed by the above mentioned verifications and actions performed by the smart card are repeated while Index$_B$ (received at step 275) is greater than zero.

The invention claimed is:

1. Electronic wallet system comprising:
   n devices capable of conducting electronic business transactions on an open network and containing a smart card reader wherein n is superior or equal to 1, said devices being interconnected through a local network;
   a plurality of smart cards representing electronic purses of said electronic wallet system, said smart card being able to contain electronic money;
   wherein one of said devices comprises an entity, called a server, which contains a list of data entries, each entry corresponding to a purse of said electronic wallet system liable to receive electronic money contained in tokens from other purses of said system;
   said server being able to store temporarily said tokens when they are transferred between purses;
   and wherein messages which are exchanged between said devices and/or said smart cards during token transfer operations are protected by secret keys which are only stored in said smart cards.

2. System according to claim 1, wherein each smart card contains:
   a unique purse identifier;
   a counter of money;
   a purse transaction identifier;
   a first purse identifier secret key; and
   a second transaction identifier secret key;
   said first and said second secret keys being shared by all the purses of said system.

3. System according to claim 2, wherein at the installation of the system, said counter of money and said transaction identifier are initialized at zero.

4. System according to claim 2, wherein each entry corresponding to a purse in said server contains:
   said purse identifier and a signature of said purse identifier using said first secret key;
   a server transaction identifier and a signature of said transaction identifier and of said purse identifier using said second secret key; and
   an index of the number of tokens received for said purse by the server.

5. System according to claim 4, wherein each smart card further contains a third token secret key shared by all the purses of said system; and
   wherein each entry corresponding to a purse in said server further contains, should the index be greater than zero:
   at least one token containing:
   an amount of money;
   said purse identifier; and
   said server transaction identifier;
   and a signature of said token using said third secret key.

6. System according to claim 5, wherein said token further contains an information about the sender of the token.

7. Process for depositing a token from a first purse for a second purse in an electronic wallet system according to claim 5, said process comprising the steps consisting, for a device comprising an entity called a client, in:
   (a) receiving a smart card corresponding to said first purse;
   (b) receiving from the server data containing:
   a purse identifier of said second purse and a signature of said purse identifier using the first secret key; and
   a server transaction identifier for said second purse and a signature of said server transaction identifier and of said second purse identifier using the second secret key;
   (c) sending to said smart card said data received from said server and the amount of money to be deposited for said second purse; said smart card verifying the signatures contained in said data using said first and said second secret keys, and should verification be positive:
   (d) receiving from said smart card data containing:
   a token and a signature of said token using the third secret key; and
   an incremented server transaction identifier for said second purse and a signature of said incremented server transaction identifier and of said second purse identifier using the second secret key;
   (e) sending to said server said data received from said smart card.

8. Process according to claim 7, further comprising, before step (b), the steps consisting in:
   (a1) sending a first message to said server to request a list of purses liable to receive tokens;
   (a2) receiving from said server a list of purse identifiers of the purses liable to receive tokens; and
   (a3) sending a second message to said server to request information about said second purse.

9. Process according to claim 7, wherein said smart card corresponding to said first purse decrements said first purse counter by the amount of money to be deposited for said second purse before step (d).

10. Process according to claim 7, wherein the token contained in data sent at step (d) comprises:
    the amount of money to be deposited for said second purse;
    said second purse identifier;
    the server transaction identifier for said second purse; and
    a random number.

11. Process according to claim 10, wherein said token further comprises:
    said first purse identifier.

12. Process according to claim 7 in an electronic wallet system in which each smart card further contains deposit trace data for each purse liable to receive tokens from other purses, said data comprising:
    an inter purse transaction identifier; and
    an inter purse deposit count; and
    wherein, before step (d), said smart card corresponding to said first purse:
    updates the inter purse transaction identifier for said second purse with the value of said server transaction identifier for said second purse received at step (b); and
    adds the amount of money to be deposited for said second purse to the inter purse deposit count for said second purse.

13. Process for recovering tokens which have been deposited for one first purse using a process according to claim 12 but which have not been received by said purse when using a process wherein the first purse verifies a received token, increments a purse counter by the amount of money contained in the verified token, and stores in a purse transaction identifier a value of a server transaction identifier incremented by one said process comprising the steps consisting, for a device containing the server in:
- (i) successively receiving the smart cards corresponding to all the other purses of said system and, for each of said purses, receiving deposit trace data for said first purse, said deposit trace data containing
   the inter purse transaction identifier; and
   the inter purse deposit count;
- (j) receiving the smart card corresponding to said first purse;
- (k) sending to said smart card all the deposit trace data received at step (i);

the process further comprising the steps consisting for said smart card in:
- (l) calculating the sum of the received inter purse deposit counts minus the receive count of said first purse and incrementing the counter of said first purse with the result of this calculation;
- (m) setting the receive count of said first purse to zero.

14. Process according to claim 13, further comprising, before step (i), the steps consisting in:
- (h1) receiving the smart card corresponding to said first purse;
- (h2) sending to said smart card a first message requesting a random number; and
- (h3) receiving from said smart card a random number;
said random number being sent, at step (i), with the first purse identifier to each smart card corresponding to all the other purses of said system in a second message and wherein each deposit trace data for said first purse received at step (i) further contains:
   said random number;
   the purse identifier each other purse; and
   said first purse identifier.

15. Process according to claim 14 in a system in which each smart card further contains a fourth token recovery secret key, wherein a signature of said deposit trace data using said fourth secret key is attached to said deposit trace data received at step (i).

16. Process according to claim 15, further comprising, before step (I), the steps consisting for the smart card corresponding to said first purse in:
   verifying the signature of said deposit trace data using said fourth secret key; and
   verifying that the random number contained in said deposit trace data matches the random number generated by said smart card before step (h3);
   the steps (I) and (m) being executed only if said verifications are positive.

17. Process according to claim 16 further comprising, after step (I) the step consisting for the smart card corresponding to said first purse in:
   updating said first purse transaction identifier with the maximum value of:
   said first purse transaction identifier; and
   each inter purse transaction identifier contained in the deposit trace data incremented by one.

18. Process for receiving a token in a purse in an electronic wallet system according to claim 5, said process comprising the steps consisting, for a device comprising an entity called a client, in:
- (a) receiving a smart card corresponding to said purse;
- (b) sending to the server a message to request a token stored for said purse in the server, and should at least one token be stored in the entry corresponding to said purse in the server:
- (c) receiving from the server the index and a token stored in the entry corresponding to said purse;
- (d) sending the token to said smart card; and
- (e) repeating steps (b) to (d) while the value of the received index is greater than zero.

19. Process according to claim 18, wherein the server decrements said index before step (c).

20. Process according to claim 18, further comprising, before step (b), the steps consisting in:
- (a1) sending to said smart card a first message to request the purse identifier; and
- (a2) receiving from said smart card said purse identifier.

21. Process according to claim 18, wherein a signature of the token using said third secret key is attached to the token received at step (c) and is sent to said smart card at step (d);
   said process further comprising the steps consisting, for said smart card in:
- (d1) verifying said signature of the token and
- (d2) verifying that the server transaction identifier contained in said token is greater than or equal to the purse transaction identifier stored in said smart card; and should verifications be positive:
- (d3) incrementing the purse counter by the amount of money contained in said token; and
- (d4) storing in said purse transaction identifier the value of the server transaction identifier incremented by one.

22. Process according to claim 21 in an electronic wallet system in which each smart card further contains receive trace data comprising a receive count,
   wherein, after step (d4), said smart card adds the amount of money contained in said token to the receive count of said purse.

23. Process for registering a purse in a system according to claim 2, said process comprising the steps consisting for a device containing said server in:
- (a) receiving a specific smart card, called the root card;
- (b) receiving a personal identification number entered by a user on said device and sending said personal identification number to said root card, said root card verifying that the received personal identification number matches a personal identification number stored in said root card; and should verification be positive:
- (c) receiving a smart card corresponding to the purse to be registered ; and
- (d) receiving from said smart card data containing:
   a purse identifier and a signature of said purse identifier using said first secret key;
   a server transaction identifier initialized with the value of the purse transaction identifier stored in said smart card and a signature of said server transaction identifier and of said purse identifier using said second secret key; and
- (e) storing the data received from said smart card in the entry corresponding to said purse in said server.

24. Electronic wallet system according to claim 1, wherein each smart card of the system further contains an address of said server on the open network and wherein each device is capable of conducting remote token depositing process and/or remote token receiving process with a remote electronic wallet system connected to said open network.

* * * * *